UNITED STATES PATENT OFFICE.

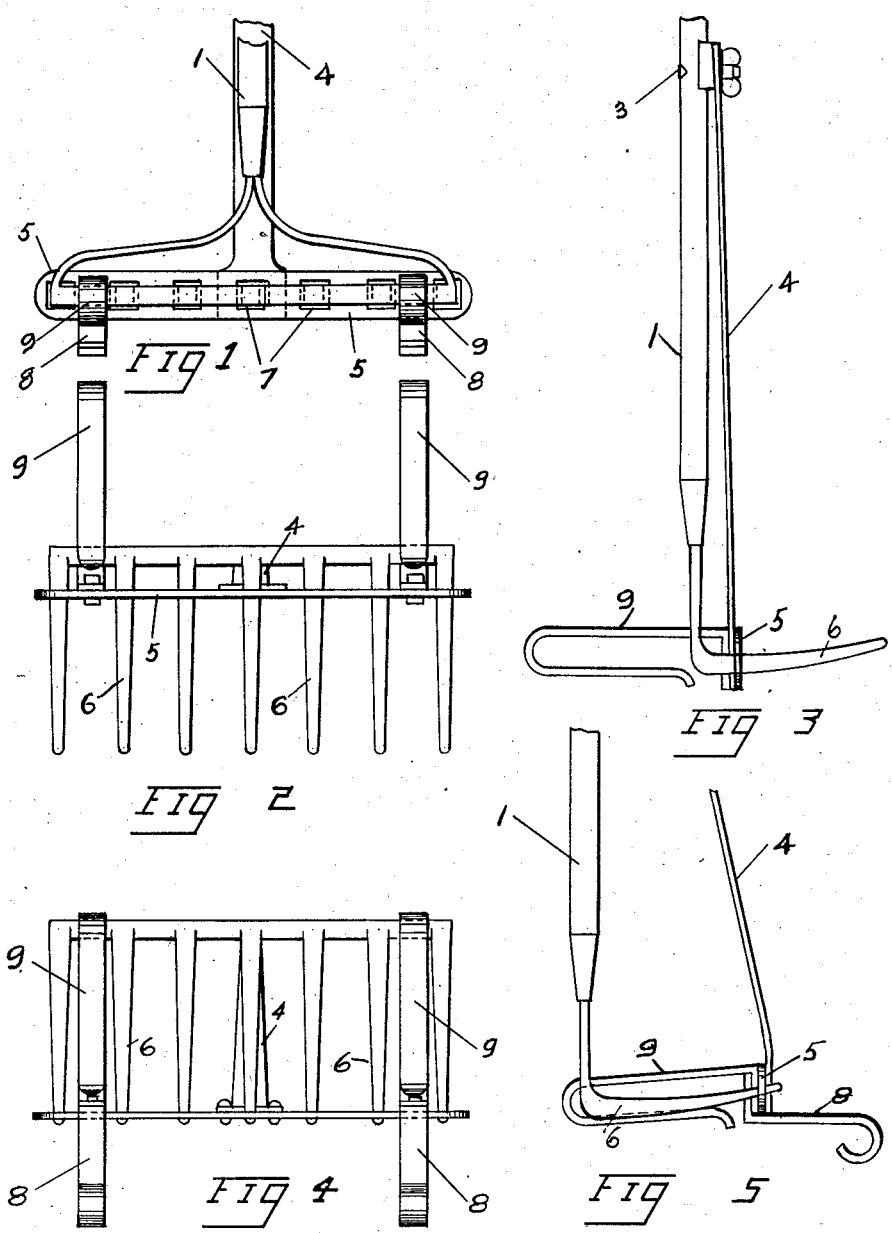

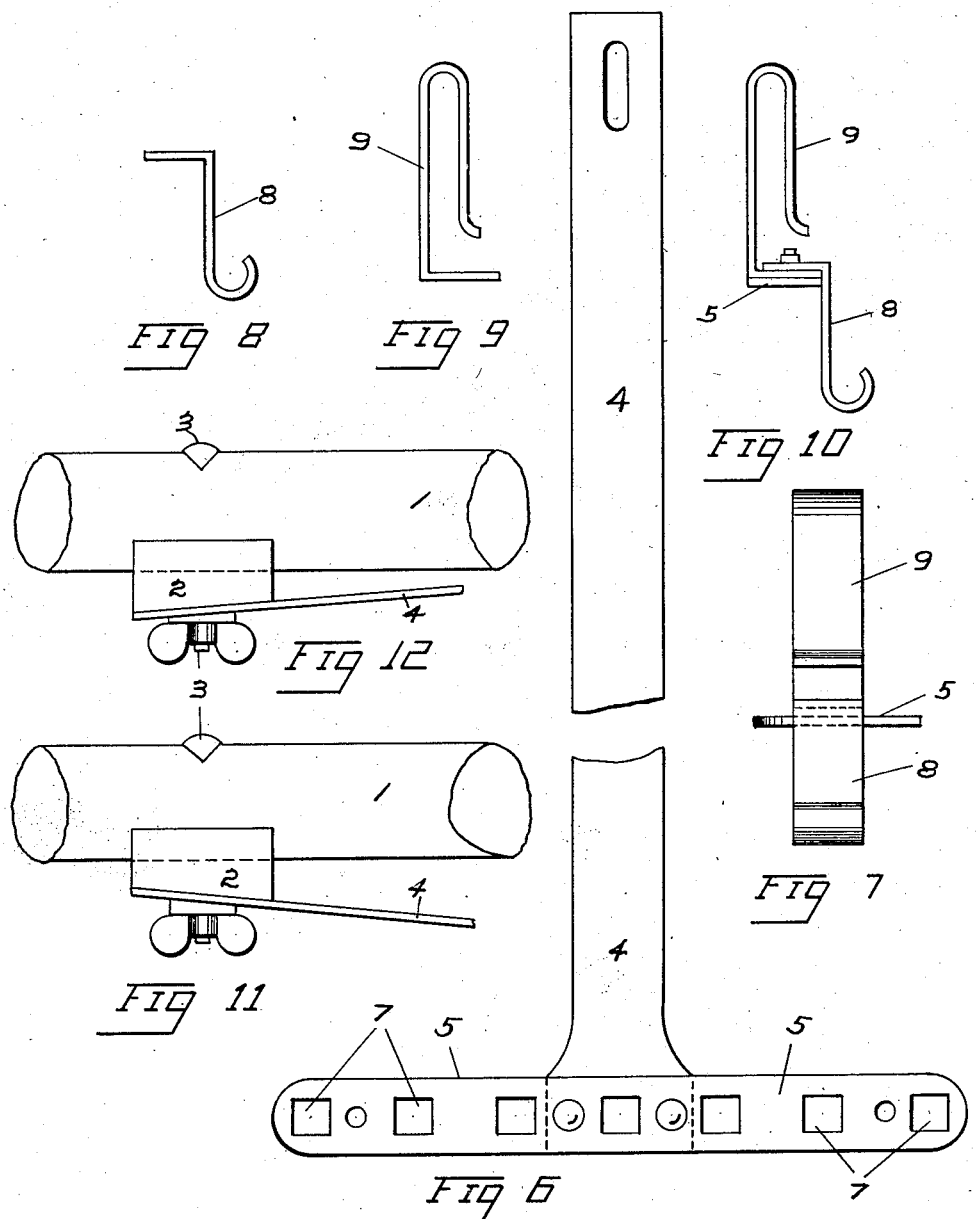

WILLIAM E. HOLDERMAN, OF SALT LAKE CITY, UTAH.

HAND-RAKE-CLEANING ATTACHMENT.

1,021,461. Specification of Letters Patent. Patented Mar. 26, 1912.

Application filed August 22, 1911. Serial No. 645,435.

*To all whom it may concern:*

Be it known that I, WILLIAM E. HOLDERMAN, a citizen of the United States, residing at Salt Lake City, in the county of Salt Lake and State of Utah, have invented certain new and useful Improvements in Hand-Rake-Cleaning Attachments, of which the following is a specification.

My invention relates to devices to automatically clean a hand rake, and my purpose is to provide a device which may be attached to any form of a garden or other rake to automatically remove grass, leaves or other debris that may accumulate on the teeth of said rake, and that will not interfere with the penetrating or retaining qualities of the teeth of the rake, and one that is light, easily attached or removed, and cheap in construction. These objects I accomplish with the device illustrated in the accompanying drawings in which similar letters of reference indicate like parts throughout the several figures.

Figure 1 is a plan view of the head piece and a portion of the handle of a hand rake with my device thereon. Fig. 2 is an end elevation of the same, with depending legs removed. Fig. 3 is a side elevation of the same with the clip turned to give a practically parallel direction to the spring. Fig. 4 is an end elevation of the device as shown in Fig. 1. Fig. 5 is a side elevation of the device as shown in Fig. 1. Fig. 6 is a plan of the spring, part cut away. Fig. 7 is a front elevation of one of the legs and retaining hooks on a portion of the cleaning blade. Fig. 8 is a side elevation of one of the legs. Fig. 9 is a side elevation of one of the retaining hooks. Fig. 10 is a side elevation of the parts shown in Fig. 7. Fig. 11 is a side elevation of the fastening clip in place on a portion of the handle and spring. Fig. 12 is a side elevation of the same with the clip turned to give the other direction to the spring.

In the use of the ordinary hand or garden rake to remove leaves or grass from lawns and gardens, the teeth of the rake frequently become clogged or incumbered with said leaves, grass or other debris to such an extent that it becomes necessary to remove it. The said debris frequently becomes so firmly entangled in and around the teeth of the rake as to require the user to remove it with his fingers. I accomplish the removal of said debris automatically and at each stroke of the rake, thus leaving the debris in rows or piles if desired.

In the drawings illustrating my device the rake shown is one of the ordinary hand rakes and to the handle 1, of the rake is firmly secured a fastening clip 2. The said clip 2 is formed on one side to fit the form of the handle 1 by a grooved or semicylindrically shaped channel therein, and is attached to said handle by the threaded bolt 3 and nut thereon. The opposite side of said clip 2 is inclined, forming an acute angle. On this side of said clip 2 is detachably secured one end of a flat spring 4, on the other end of which is attached a cleaning blade 5. The form of the clip 2 and the tension of the said spring 4 keeps the said blade 5 normally in position near the points of the teeth 6 of said rake, while the spring allows the said blade 5 to be raised, thus allowing the teeth 6 to enter the soil or uncut grass over which the rake is being moved, and to gather and retain thereon at each movement any debris, leaves or cut grass in the path of said rake while the pressure necessary to gather said debris keeps it on the rake. When said pressure is released from the handle by the user, and the rake is moved forward to engage other or unraked ground the flexing of the spring 4 will push the said blade 5 down or longitudinally on the teeth; and any leaves, grass or debris will be removed from the teeth and fall in a pile or row as released. The said blade 5 has openings 7, cut therein in which the teeth 6 of the rake are made to operate, the said openings 7 may be made in any desired form to conform to the cross section shape of the teeth. However, without departing from the spirit of my invention the said blade 5 may be two parallel rods or bars with cross rods or bars connecting them at intervals to provide a cleaner for each tooth. On the under side of said blade 5 and near each end thereof, is attached the depending legs 8, each having the lower end curved to form a foot which first striking the ground forces the said blade up on the teeth leaving their points free. On the upper side of said blade 5 is attached retainers 9, bent to form a hook on each one thereof that engages the head piece of the rake and prevents the said blade from being removed below the plane of the point of the teeth.

When it is desired that the rake teeth temporarily retain upon them the debris to be removed, the nut on said bolt 3 is loosened and the said clip 2 is turned with the apex of the angle toward the teeth and fastened in that position. This will keep the spring 4 normally parallel with the handle 1 of the rake and the blade 5 near the head piece of the rake. When the debris has accumulated on the teeth 6 of the rake it may be removed by striking the said retainers 9 with force enough to move the blade 5 longitudinally along the teeth of the rake. When used for this purpose the spacing feet 8 may be removed if desired.

Having thus described my invention I desire to secure by Letters Patent and claim:—

1. In combination with a garden rake, a cleaning blade having apertures therethrough receiving the teeth of said rake, a flat spring attached to said blade and adjustably attached to the handle of the rake, depending legs attached to said blade, retaining hooks fastened to upper side of said blade and having a hook formed on their upper ends adapted to engage the head piece of said rake, and a clip between said spring and the handle of the rake adapted to give direction to said spring.

2. In combination with a hand rake, a blade having openings therethrough conforming to the form of the teeth of the rake and within which the teeth of the rake are made to operate, a flat spring one end of which is secured to said blade and whose other end is bolted to the handle of the rake, a clip conforming on one side to the form of the handle of the rake and flat on the other side with said sides inclined toward each other adapted to give direction to said spring and thereby to the normal position of said blade on the teeth of the rake, depending legs secured on said blade and adapted by contact with the ground to flex said spring, and retaining hooks fastened to the upper side of said blade adapted to limit the downward movement of said blade.

In testimony whereof I have affixed my signature in presence of two witnesses.

WILLIAM E. HOLDERMAN.

Witnesses:
SAM RANEY,
D. MACMILLAN.

---

Copies of this patent may be obtained for five cents each, by addressing the "Commissioner of Patents, Washington, D. C."